Aug. 1, 1939.   D. D. AREHART   2,168,148
DRAFT APPARATUS FOR TRAILERS
Filed Nov. 16, 1936
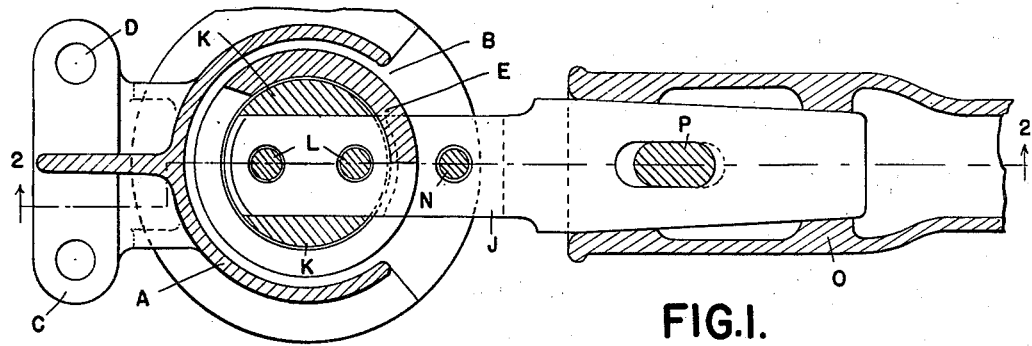
FIG.1.
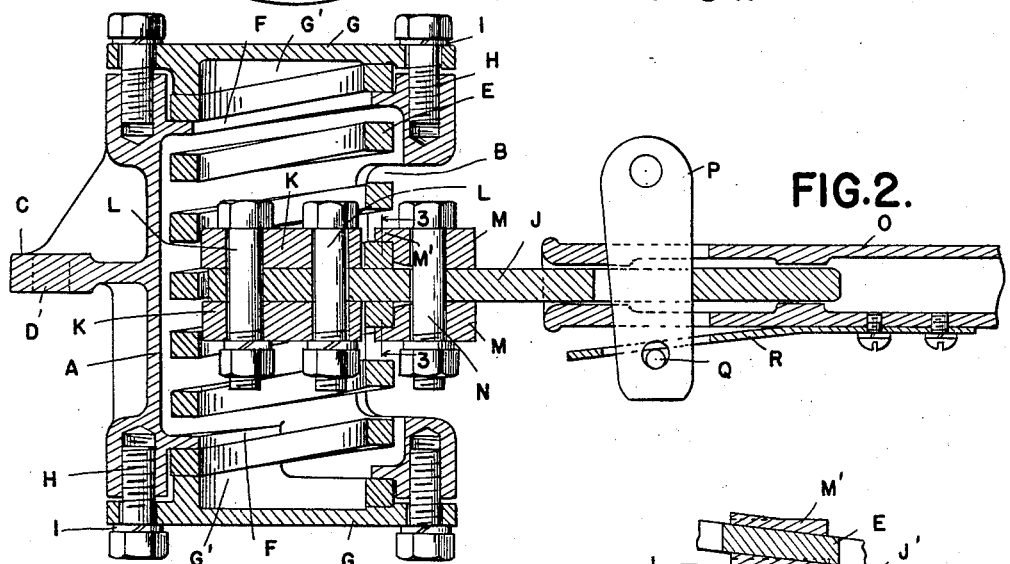
FIG.2.
FIG.3.
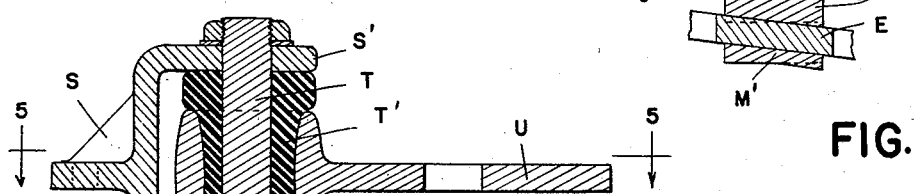
FIG.4.
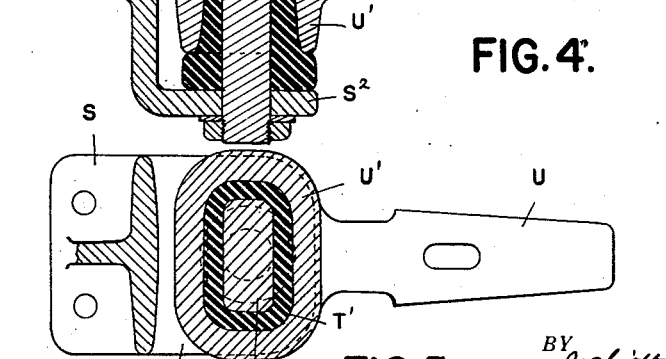
FIG.5.
INVENTOR
DAVID D. AREHART
BY *Whittemore Hulbert & Belknap*
ATTORNEYS Patented Aug. 1, 1939

2,168,148

UNITED STATES PATENT OFFICE 2,168,148

DRAFT APPARATUS FOR TRAILERS

David D. Arehart, Flint, Mich., assignor to Palace Travel Coach Corporation, Flint, Mich., a corporation of Michigan Application November 16, 1936, Serial No. 111,167

7 Claims. (Cl. 280—33.9)

The invention relates to draft connections for motor vehicle trailers and consists in the novel construction as hereinafter set forth.

In the drawing:

Figure 1 is a vertical longitudinal section;

Figure 2 is a horizontal section on line 2—2 of Figure 1;

Figure 3 is a cross section on line 3—3 of Figure 2;

Figure 4 is a horizontal section through a modified construction;

Figure 5 is a vertical section on line 5—5 of Figure 4.

It is the object of the invention to normally hold the trailer in alignment with the tractor and at the same time to provide sufficient freedom of movement for turning and to take care of vertical oscillations incident to road shocks. This I have accomplished by a novel construction of resilient draft head adapted to be mounted on the tractor and to which the trailer drawbar can be readily attached, the detailed construction being as follows:

As shown in Figures 1 to 3, A is a housing of substantially cylindrical form but having its rear portion centrally cut away as indicated at B. C is a bracket integral with the housing and projecting forwardly from the central portion thereof, being provided with apertures D for the engagement of the bolts for rigidly attaching it to the tractor (not shown). E is a helical spring preferably formed from a bar of rectangular cross section being of a length corresponding to that of the housing A and of an external diameter slightly less than the internal diameter of said housing. The opposite ends of the housing A are provided with helical bearing flanges F for engaging the opposite end convolutions of the spring E. These convolutions are then clamped to the flanges F by heads G having correspondingly formed helical bearings G'. These heads are secured to the housing by tap bolts H and lock washers I. J is a drawbar tongue which extends through the cut away portion B of the housing and passes between adjacent convolutions in the central portion of the spring E. It is then secured in this position by circular blocks K of a diameter to substantially fit within the spring, said blocks being clamped on opposite sides of the tongue by bolts L passing therethrough. The tongue is further attached to the spring to prevent independent rotational movement, this being accomplished by clamping members M. These members are provided with helical flanges M' for fitting over the convolutions of the spring which are adjacent to the tongue. The tongue is also formed with a portion J' similarly inclined and a bolt N clamps these parts together. Thus the frictional engagement between the flanges M' and the convolutions of the spring will hold the members M and the tongue J from any rotational movement independent of the spring. The tongue J is adapted to telescopically engage a hollow drawbar O suitably attached to the trailer (not shown), and these parts are then secured by a coupling pin or key P inserted through registering apertures therein. The pin P is held from accidental disengagement by a cross-pin Q and a spring strip R, the latter being secured to the drawbar O.

With the construction as described, it will be understood that the spring E has sufficient rigidity to normally hold the tongue J so as to project rearward in alignment with the tractor and the drawbar O when engaged with said tongue is similarly held. When, however, there is a change in direction of movement of the tractor which necessitates an angular movement of the drawbar, the central portion of the spring will yield to permit such movement. Also, the spring will yield to cushion draft and inertial stresses, while vertical oscillations of the draft bar are permitted by a torsional movement of the spring. In fact universal movement of the drawbar is permitted, but at the same time the spring will also tend to restore the bar to its normal position of alignment. The holding of the tongue in alignment is particularly advantageous when the trailer is being backed by the tractor, but it is also useful in guiding the forward movement and in cushioning shocks of all kinds.

Figures 4 and 5 show a modified construction in which the helical spring is dispensed with and the same effect is obtained by other resilient means. In detail, S is a bracket member adapted to be rigidly attached to the tractor and having a rearwardly extending bifurcated portion. Extending between the furcations S' and S² is a bar T on which is placed a sleeve T' of resilient material, such as rubber. U is the draft bar provided at its forward end with an eye portion U' surrounding the sleeve T'. The resiliency of the sleeve T' is sufficient to permit a universal angular movement of the draft bar with respect to the member S, but will always tend to restore the bar into its central position. Thus the function performed by the sleeve T' is substantially the same as that by the helical spring E shown in Figures 1 to 4.

What I claim as my invention is:

1. A draft rigging for connecting vehicles comprising a cylindrical housing rigidly attached to one of said vehicles, said housing being centrally cut away on one side thereof, a helical spring arranged within said housing with a clearance therebetween, bearings at the opposite ends of said housing for engaging end convolutions of said spring, means for clamping said convolutions against said bearings to rigidly attach the same to said housing, a draft tongue extending between convolutions in the central portion of said spring and outward through the cut away portion of said housing, and a circular block fitting within said spring secured to said draft tongue.

2. A draft rigging for connecting vehicles comprising a cylindrical housing rigidly attached to one of said vehicles, said housing being centrally cut away on one side thereof, a helical spring arranged within said housing with a clearance therebetween, bearings at the opposite ends of said housing for engaging end convolutions of said spring, means for clamping said convolutions against said bearings to rigidly attach the same to said housing, a draft tongue extending between convolutions in the central portion of said spring and outward through the cut away portion of said housing, and a pair of circular blocks fitting within said spring secured to said tongue on opposite sides thereof.

3. A draft rigging for connecting vehicles comprising a cylindrical housing rigidly attached to one of said vehicles, said housing being centrally cut away on one side thereof, a helical spring arranged within said housing with a clearance therebetween, bearings at the opposite ends of said housing for engaging end convolutions of said spring, means for clamping said convolutions against said bearings to rigidly attach the same to said housing, a draft tongue extending between convolutions in the central portion of said spring and outward through the cut away portion of said housing, a pair of circular blocks fitting within said spring secured to said tongue on opposite sides thereof, and means for clamping to said tongue the convolutions of said spring on opposite sides thereof to hold the same from relative rotation.

4. A draft rigging for connecting vehicles comprising a cylindrical housing rigidly attached to one of said vehicles having open ends and centrally cut away on one side, a helical spring arranged within said housing with a clearance therebetween, helical bearings in the opposite end portions of said housing for engaging end convolutions of said spring, heads at the opposite ends of said housing having helical portions for engaging said end convolutions of the spring, bolts for attaching said heads to said housing and clamping said end convolutions between said helical bearings, a draft tongue extending through said cut away portion of said housing and between adjacent convolutions in the central portion of said spring, a circular block fitting within said spring and secured to said tongue, and means for also clamping said tongue to one or more convolutions of said spring to prevent relative rotation thereof.

5. A draft rigging for connecting vehicles comprising a member adapted for rigid attachment to one of said vehicles a helical spring mounted on said member with its axis extending transversely thereof, said spring having its opposite end convolutions held in rigid relation to each other, and a draft bar attached to the central portion of said spring.

6. A draft rigging for connecting vehicles comprising a member adapted for rigid attachment to one of said vehicles a helical spring mounted on said member with its axis extending transversely thereof, said spring having its opposite end convolutions held in rigid relation to each other and to the vehicle, the convolutions intermediate the ends being free, a draft bar extending between adjacent central convolutions of said spring, and a circular block connected to said draft bar within said spring.

7. A draft rigging for connecting vehicles comprising a member adapted for rigid attachment to one of said vehicles a helical spring arranged in a horizontal plane and having its axis transverse to the line of draft the opposite end convolutions of said spring being anchored to said member and held in rigid relation thereto and to each other, a draft bar extending between central convolutions of said spring, and a pair of circular blocks clamped to the portion of said draft bar within said spring and forming a draft head therefor.

DAVID D. AREHART.